United States Patent
Chien

(10) Patent No.: US 10,442,497 B2
(45) Date of Patent: Oct. 15, 2019

(54) EASY-ADJUSTMENT BICYCLE GEAR-SHIFTING SYSTEM

(71) Applicant: AD-II ENGINEERING INC., Taichung (TW)

(72) Inventor: Chi-Ming Chien, Taichung (TW)

(73) Assignee: AD-II Engineering Inc., Taichung (TW)

( * ) Notice: Subject to any disclaimer, the term of this patent is extended or adjusted under 35 U.S.C. 154(b) by 92 days.

(21) Appl. No.: 15/496,682

(22) Filed: Apr. 25, 2017

(65) Prior Publication Data

US 2018/0304966 A1 Oct. 25, 2018

(51) Int. Cl.
*B62M 9/122* (2010.01)

(52) U.S. Cl.
CPC .................................. *B62M 9/122* (2013.01)

(58) Field of Classification Search
CPC ...... B62M 9/122; B62M 9/123; B62M 9/132; B62M 9/133; B62M 25/08
See application file for complete search history.

(56) References Cited

U.S. PATENT DOCUMENTS

| | | | |
|---|---|---|---|
| 6,682,087 B1 | 1/2004 | Takeda | |
| 8,249,782 B2 | 8/2012 | Miglioranza | |
| 2005/0215369 A1* | 9/2005 | Fukuda | B62M 25/08 474/82 |
| 2009/0164076 A1* | 6/2009 | Vasiliotis | B62M 11/16 701/55 |
| 2009/0209375 A1* | 8/2009 | Takamoto | B62M 9/122 474/18 |
| 2009/0210118 A1* | 8/2009 | Takamoto | B62M 9/122 701/49 |
| 2014/0303857 A1* | 10/2014 | Takamoto | B62M 25/00 701/51 |
| 2016/0096589 A1* | 4/2016 | Sato | B62M 25/08 474/70 |
| 2016/0288877 A1* | 10/2016 | Goates | B62M 25/08 |

FOREIGN PATENT DOCUMENTS

| | | |
|---|---|---|
| TW | I248410 | 2/2006 |
| TW | I315280 | 10/2009 |
| TW | I337964 | 3/2011 |

* cited by examiner

*Primary Examiner* — Jacob S. Scott
*Assistant Examiner* — Lori Wu
(74) *Attorney, Agent, or Firm* — Muncy, Geissler, Olds & Lowe, P.C.

(57) ABSTRACT

An easy-adjustment bicycle gear-shifting system consisting of a microcontroller unit, a memory, a driver and a derailleur is disclosed. The memory has stored therein more than three position tables each containing the position information of the derailleur relative to the chainrings. The position information contained in one position table has a part or all different from the position information contained in every other position table. The position tables are arranged one after another in a proper order corresponding to one same chainring in such a manner that every two adjacent position tables are differed by a distance value corresponding to one same chainring. The microcontroller unit selects one position table, and drives the driver to shift the derailleur to the corresponding position according to the position information of the selected position table.

6 Claims, 5 Drawing Sheets

EASY-ADJUSTMENT BICYCLE GEAR-SHIFTING SYSTEM

BACKGROUND OF THE INVENTION

1. Field of the Invention

The present invention relates to bicycle gearshift technology and more particularly, to an easy-adjustment bicycle gear-shifting system.

2. Description of the Related Art

Since cycle riding has become a growing trend, bike's self-controlled fine-tuning requirements are getting higher and higher, and thus, the bicycle industry has proposed different forms of gear-shifting mechanisms and electronic control modes. For example, Taiwan Patent I248410 discloses "bicycle derailleur control device and method", which, each time the sprocket is adjusted, a memory updating means stores the adjusted new gearshift position data in a memory; Taiwan Patent I315280 "Electronic relay-assisted bicycle shift lever and related method" in which, at each speed change, the amount of movement to the new shift position is reset by using a logic variable; Taiwan Patent I337964 "Electronic server-assisted bicycle transmission mechanism and related method", which is to compare the chainring diameter, and then to determine the amount of upward or downward displacement according to the comparison result; U.S. Pat. No. 8,249,782 B2 "Method for electronically controlling a bicycle gearshift and electronic system for a bicycle", which teaches the technique of firstly moving to the largest or smallest chainring, and then moving to the destination chainring according to a gearshift position.

As the number of times of gearshift is based on the difficulty of riding, the higher the difficulty of riding, the more the number of times and the shorter the requirement for the gear-shifting time. In Taiwan Patent I315280 and U.S. Pat. No. 6,682,087 B1, an internal computation is necessary for each gear-shifting operation. In U.S. Pat. No. 8,249,782 B2, it is necessary to firstly move to the largest or smallest chainring. Obviously, these prior art designs are difficult to meet the aforesaid requirements. Further, Taiwan Patent I248410 is easier to adjust the entire gear-shift mode for one specific bicycle rider, however, it is a kind of technology to memorize and set individual derailleur positions. For the overall derailleur position control it is too complicated and difficult to operate.

SUMMARY OF THE INVENTION

The present invention has been accomplished under the circumstances in view. It is the main object of the present invention to provide an easy-adjustment bicycle gear-shifting system, which allows overall adjustment of the derailleur position in an extremely convenient and accurate manner.

It is another object of the present invention to provide an easy-adjustment bicycle gear-shifting system, which, the completion of adjustment, can read the values of the position tables to carry out gear-shifting during rider without needing to calculate the position value, having the effects of fast completion of gear-shifting and saving calculating energy.

To achieve these and other objects of the present invention, an easy-adjustment bicycle gear-shifting system comprises a microcontroller unit, a memory electrically connected to the microcontroller unit, a driver electrically connected to the microcontroller unit, a derailleur connected to the driver and controllable by the driver to move the chainrings of a bicycle so as to shift the chain of the bicycle. The memory has stored therein at least three position tables. Each position table contains the position information of the derailleur relative to the chainrings. The position information contained in one position table has at least a part different from the position information contained in every other position table. The position tables are arranged one after another in a proper order corresponding to one same chainring. Every two adjacent said position tables are differed by a distance value corresponding to one same chainring. Further, the microcontroller unit selects one position table, and drives the driver to shift the derailleur to the corresponding position according to the position information of the selected position table.

Thus, by means of the microcontroller unit to select one position table for adjustment, the adjustment of the position of the derailleur is a holistic adjustment, and thus, the adjustment is simple and accurate. Further, the invention allows direct reading of the values of the position tables for gear-shifting during riding after the adjustment is done without any further calculation, having the effects of fast completion of gear-shifting and saving calculating energy.

Other advantages and features of the present invention will be fully understood by reference to the following specification in conjunction with the accompanying drawings, in which like reference signs denote like components of structure.

DETAILED DESCRIPTION OF THE INVENTION

Figure 1:
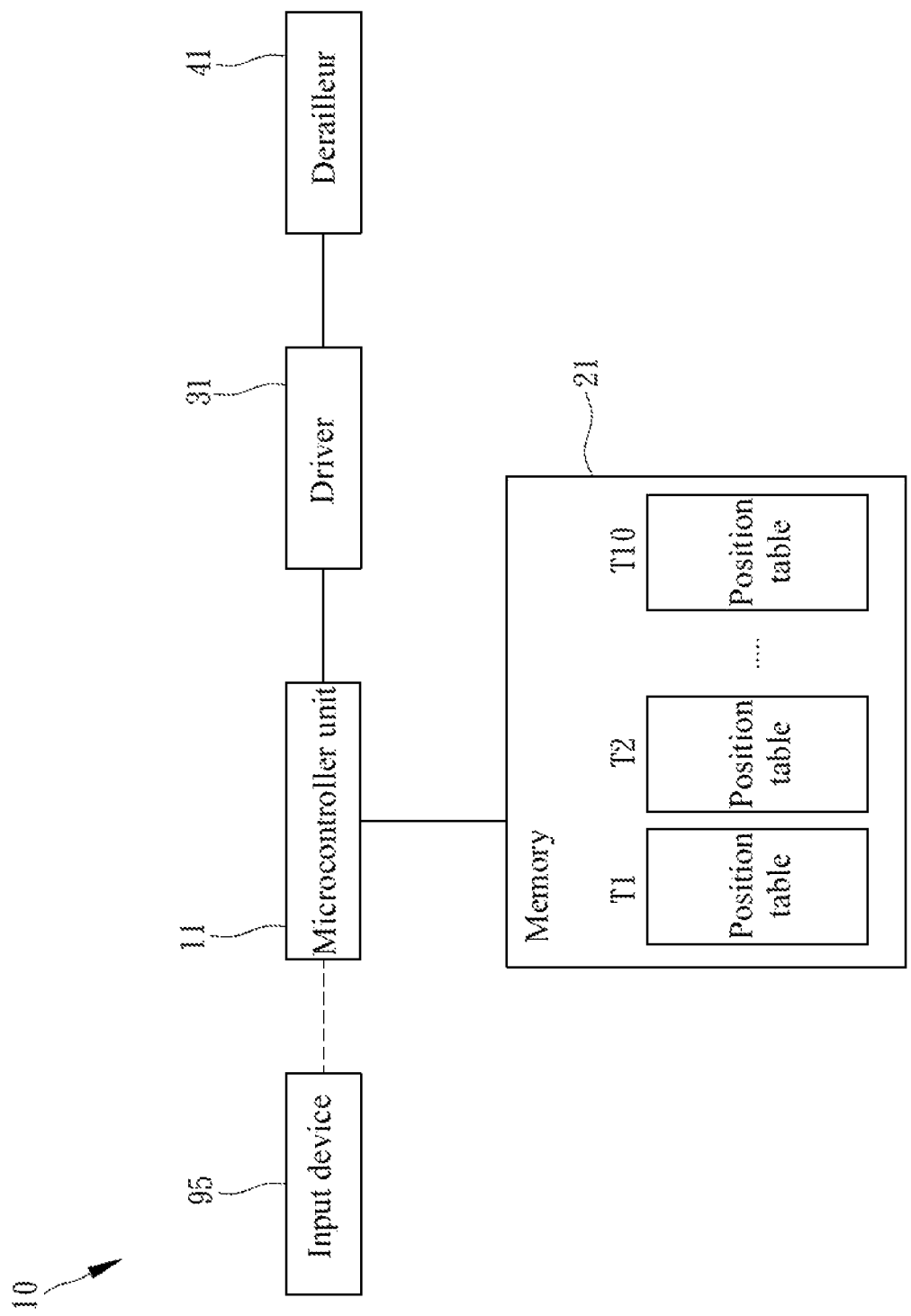
FIG. 1 is a circuit block diagram of an easy-adjustment bicycle gear-shifting system in accordance with a first embodiment of the present invention.
Figure 2:
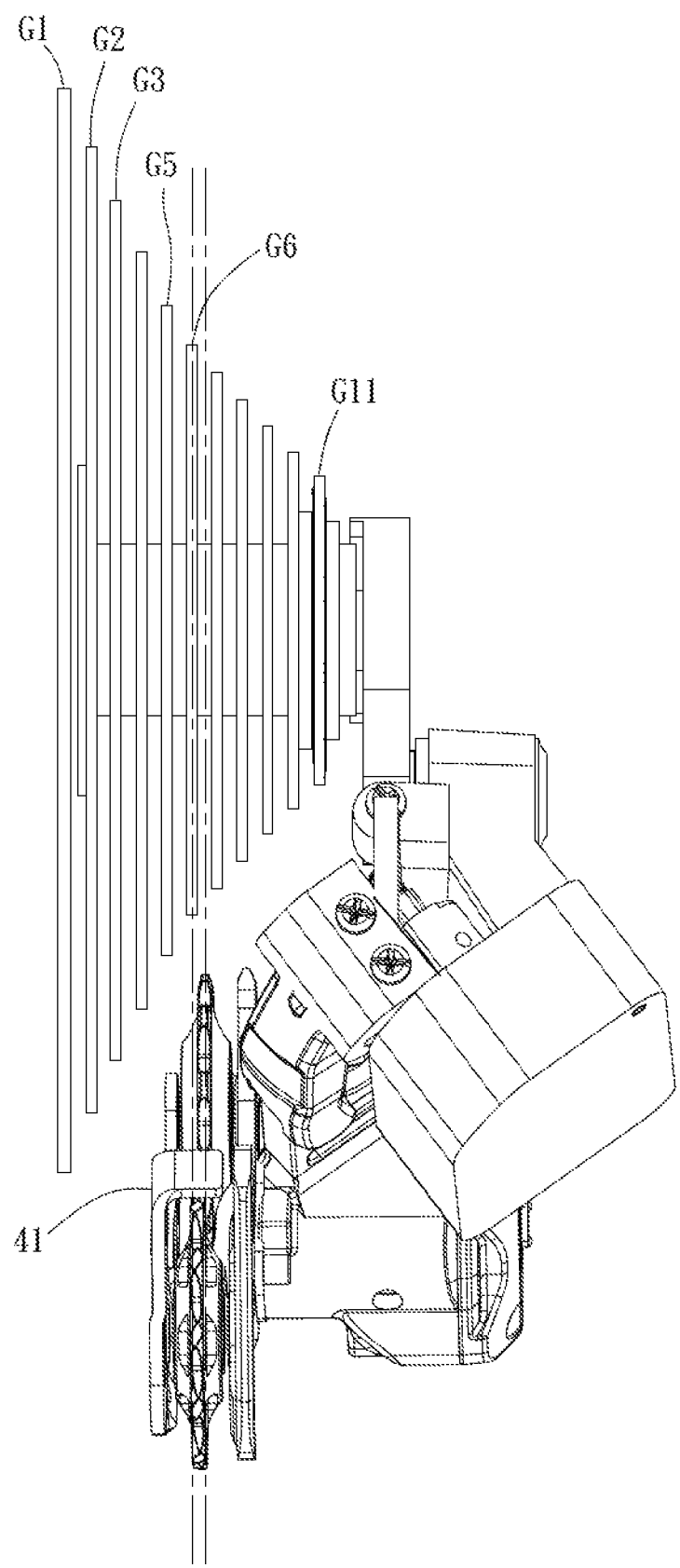
FIG. 2 is a schematic drawing illustrating an operating status of the easy-adjustment bicycle gear-shifting system in accordance with the first embodiment of the present invention.
Figure 3:
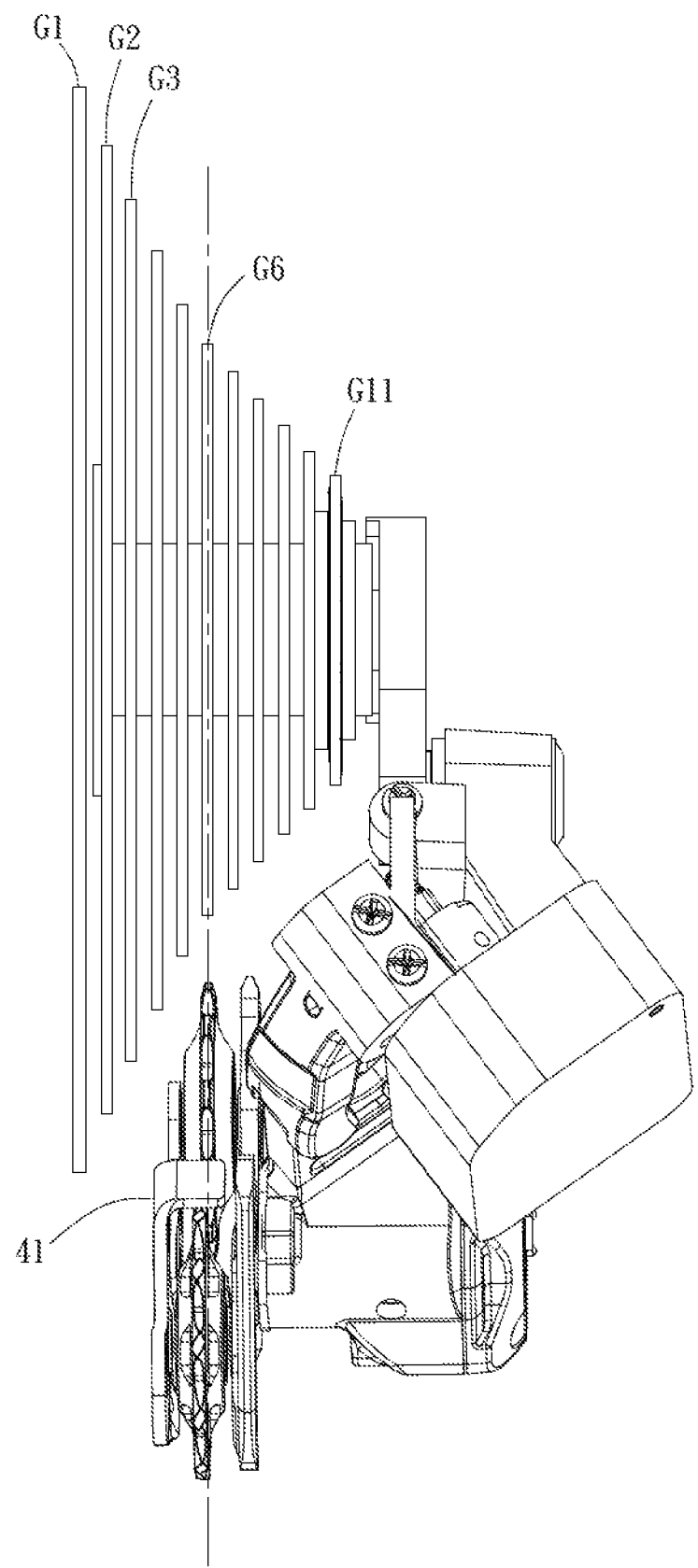
FIG. 3 is a schematic drawing illustrating another operating status of the easy-adjustment bicycle gear-shifting system in accordance with the first embodiment of the present invention.

Referring to FIGS. 1-3, an easy-adjustment bicycle gear-shifting system 10 in accordance with a first embodiment of the present invention is shown. The easy-adjustment bicycle gear-shifting system 10 comprises a microcontroller unit 11, a memory 21, a driver 31 and a derailleur 41.

The microcontroller unit 11 has processing and computing capabilities.

The memory 21 is electrically connected to the microcontroller unit 11. In actual implementation, the memory 21 can be a memory built in the microcontroller unit 11, or an independent memory. Further, the memory 21 can be a nonvolatile memory, or an erasable memory.

The driver 31 is electrically connected to the microcontroller unit 11.

The derailleur 41 is physically connected to the driver 31, and drivable by the driver 31 to move relative to a plurality of chainrings G1-G11 of a bicycle (not shown) to shift the chain (not shown) of the bicycle from one chainring G5 (for example, the fifth chainring) to another chainring G6 (for example, the sixth chainring), achieving speed-shifting.

Further, the memory 21 has stored therein at least three position tables, for example, 10 position tables T1~T10. These position tables T1~T10 contain the position information of the derailleur 41 relative to the chainrings G1-G11. Further, the position information contained in one position table T1~T10 has at least a part different from the position information contained in every other position table T1~T10. In this embodiment, the position information contained in every position table T1~T10 is different from the position information contained any other position table T1~T10 in every item. The position tables T1~T10 are arranged one after another in a proper order corresponding to one same chainring (for example, the sixth chainring G6). Further, every two adjacent position tables T1~T10 are differed by a distance value corresponding to one same chainring (for example, the sixth chainring G6). If the position information of two adjacent position tables T1~T10 corresponding to one same chainring (for example, the sixth chainring G6) are same, this distance value will be zero. The position information can be angle value, distance value or length value. In this first embodiment, the position information is angle value. Every position information contained in every position table T1~T10 is the position information of the central position of every chainring G1-G11.

For the sake of expressing convenience, the first embodiment simply indicates the position tables T3~T7 as follows; based on the difference between each two adjacent position tables, the rest position tables may be deduced in the same manner.

| Position Table T3 | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position information (central position) | 592 | 542 | 492 | 442 | 392 | 342 | 292 | 242 | 192 | 142 | 92 |

| Position Table T4 | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position information (central position) | 596 | 546 | 496 | 446 | 396 | 346 | 296 | 246 | 196 | 146 | 96 |

| Position Table T5 | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position information (central position) | 600 | 550 | 500 | 450 | 400 | 350 | 300 | 250 | 200 | 150 | 100 |

| Position Table T6 | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position information (central position) | 604 | 554 | 504 | 454 | 404 | 354 | 304 | 254 | 204 | 154 | 104 |

| Position Table T7 | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position information (central position) | 608 | 558 | 508 | 458 | 408 | 358 | 308 | 258 | 208 | 158 | 108 |

Further, the microcontroller unit 11 selects one position table T1~T10, and controls the driver 31 to move the derailleur 41 to the corresponding position according to the position information of the selected position table T1~T10. The measure of the selection of one position table T1~T10 can be achieved by: enabling the microcontroller unit 11 to make a selection according to an inputted external electronic signal. Alternatively, an input device 95 can be provided and electrically connected to the microcontroller unit 11, enabling the microcontroller unit 11 to select one position table T1~T10 subject to the control of the input device 95. The input device 95 can be push-button, a rotary knob, or user interface.

After description of the main technical features of the first embodiment of the present invention, the operation of this first embodiment is outlined hereinafter.

Before the adjustment, it is common for the micro-control unit 11 to select the position table on the middle of the multiple position tables T1~T10, for example, the fifth position table T5, enabling the microcontroller unit 11 to move the derailleur 41 into alignment with the sixth chainring G6.

Thereafter, as illustrated in FIG. 2, the user visually checks whether or not the derailleur 41 is in alignment with the sixth chainring G6. If not in alignment, enable the microcontroller unit 11 to select another position table T1~T10. Since the position tables T1~T10 are arranged in the order of a difference value between each two adjacent position tables T1~T10, select the sixth position table T6 or other position table T7~T10 in the more posterior position, enabling the microcontroller unit 11 to shift the derailleur 41 toward a position having a relatively larger distance value. Selecting the fourth position table T4 or another position table T1~T3, in the more advanced position enables the microcontroller unit 11 to shift the derailleur 41 toward a position having relatively smaller distance value. In FIG. 2, the derailleur 41 is not in alignment with the sixth chainring G6, but disposed behind the sixth chainring G6, thus, enable the microcontroller unit 11 to change the selection and to choose the sixth position table T6, and then to control the displacement of the derailleur 41 to the position in conformity with the position information of the sixth chainring G6 in the position table T6. In this way, as illustrated in FIG. 3, the derailleur 41 is shifted into the actual position of the sixth chainring G6, and thus, the adjustment is done. Once the selected position table T1~T10 allows the derailleur to be aligned with one chainring, the all positioning information in the position table T1~T10 can correspond to the respective chainrings.

In the actual riding, when the microcontroller unit 11 receives a gear-shifting command or determines itself to make a gear-shifting operation, it performs the gear-shifting operation to shift the derailleur 41 into the corresponding position according to the position information in the position table T1~T10 corresponding to every chainring G1-G11.

It can be known from the above, the user can adjust the position of the derailleur 41 through the microcontroller unit 11. Further, since the multiple position information in every position table T1~T10 directly correspond to the chainrings G1-G11, when the microcontroller unit 11 adjusts the position of the derailleur 41 by referring to the selected position table T1~T10. Thus, the adjustment of the position of the derailleur 41 is a holistic adjustment, it is not necessary to employ a logic operation after each adjustment as seen in the prior art techniques, simplifying the complexity of the prior art techniques, providing the effects of fast completion of gear-shifting and saving calculating energy. Further, the adjustment is extremely convenient and accurate.

Figure 4:
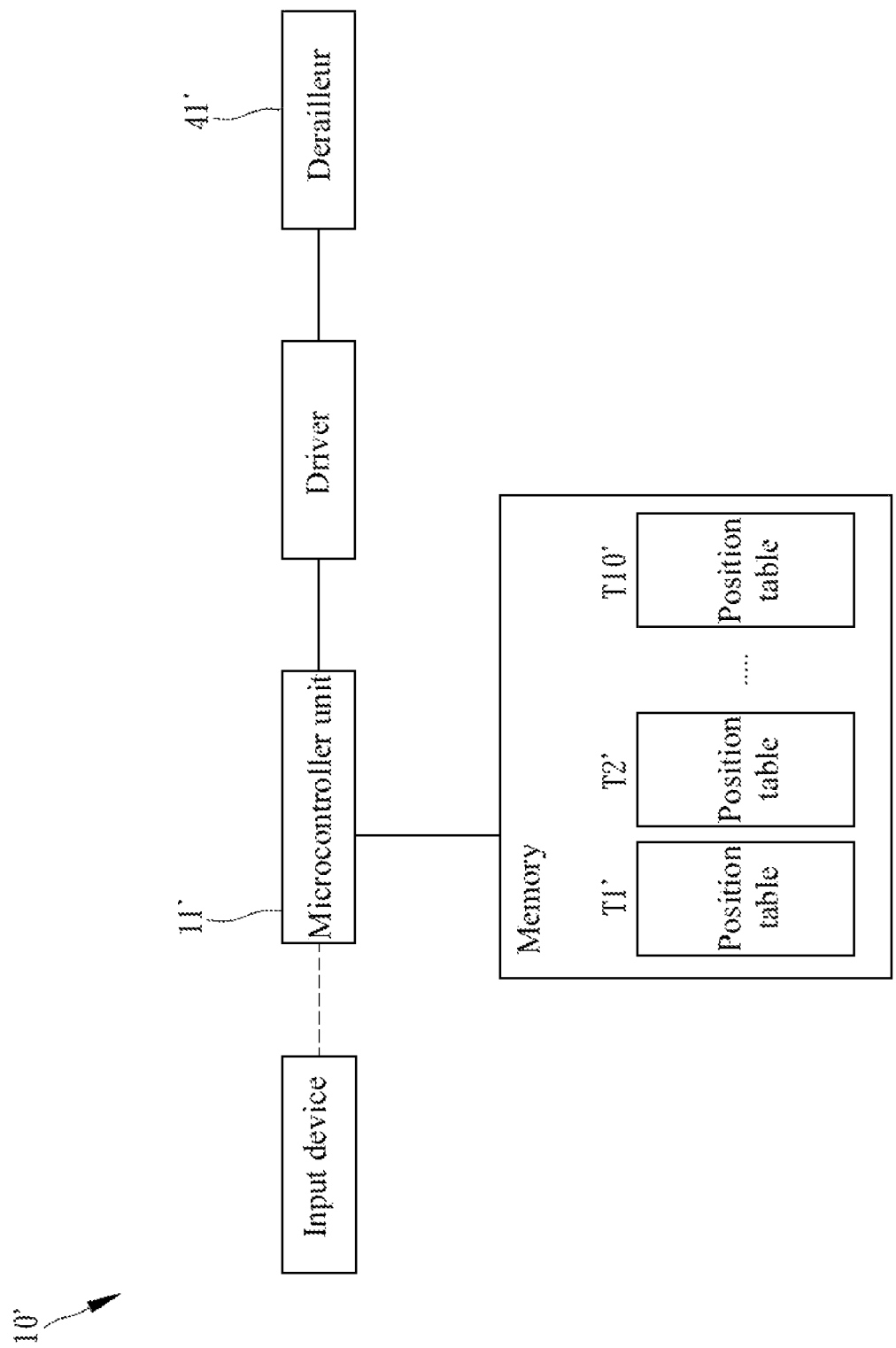
FIG. 4 is a circuit block diagram of a easy-adjustment bicycle gear-shifting system in accordance with a second embodiment of the present invention.
Figure 5:
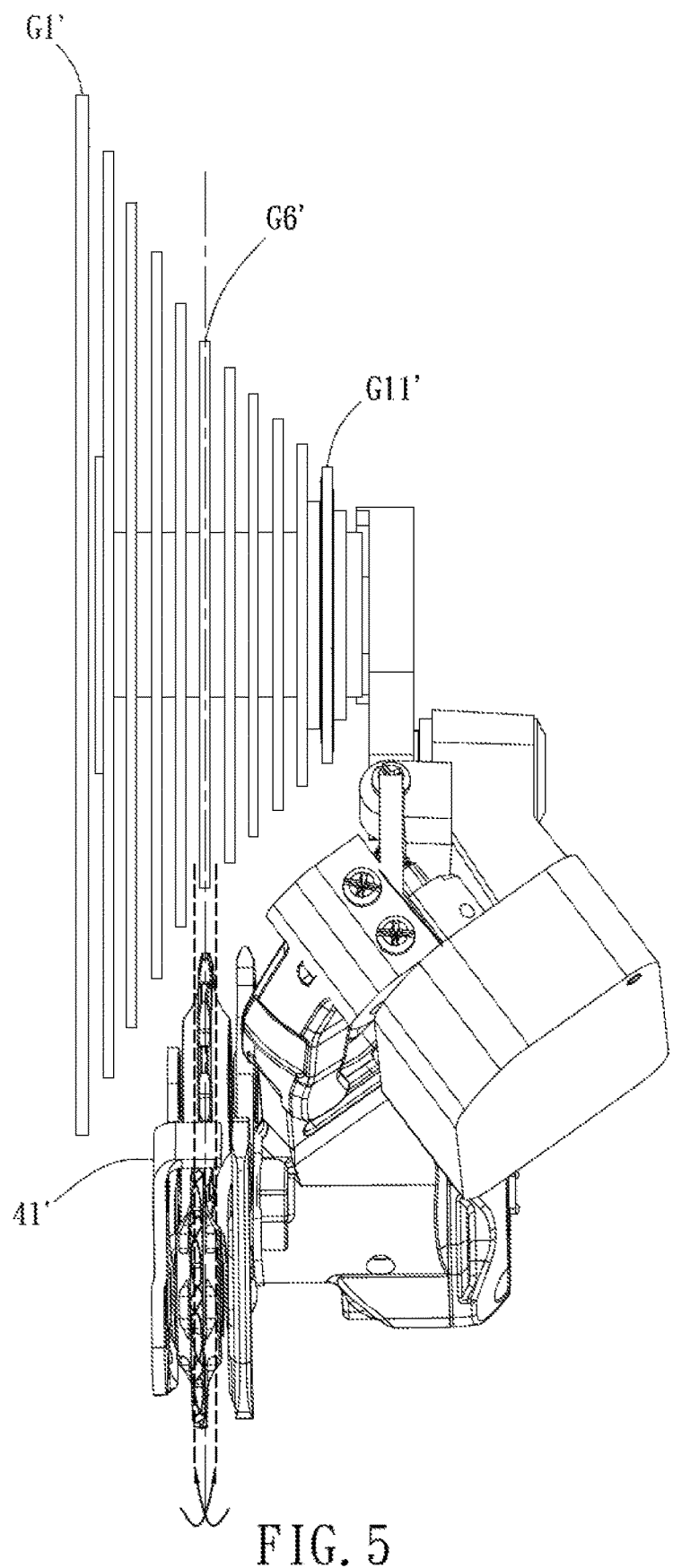
FIG. 5 is a schematic drawing illustrating an operating status of the easy-adjustment bicycle gear-shifting system in accordance with the second embodiment of the present invention.

Referring to FIGS. 4 and 5, an easy-adjustment bicycle gear-shifting system 10' in accordance with a second embodiment of the present invention is shown. This second embodiment is substantially similar to the aforesaid first embodiment with the exceptions as described hereinafter.

The position information contained in each position table T1'~T10' is not simply corresponding to the central position of each chainring G1'-G11', it also corresponds to the chain engage position of the chain at one side of each chainring G1'-G11' and the chain disengage position of the chain at the other side of each chainring G1'-G11', i.e., each position information contains the central position, the chain engage position and the chain disengage position; the chain engage position of every position information is in the advanced position relative to the associating central position and different from the associating central position by a predetermined value; the central position is in the advanced position relative to the associating chain disengage position and different from the associating chain disengage position by a predetermined value. In actual application, the aforesaid two predetermined values are the same. In FIG. 5, for easy understanding, the central position is indicated by a solid line, and, the chain engage position and the chain disengage position are indicated by imaginary lines.

For the sake of expressing convenience, the second embodiment simply indicates the position tables T3'~T7' as follows; based on the difference between each two adjacent position tables, the rest position tables may be deduced in the same manner.

| | Position Table T3' | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position Information (Chain engage position) | 602 | 552 | 502 | 452 | 402 | 352 | 302 | 252 | 202 | 152 | NA |
| Position Information (Central position) | 592 | 542 | 492 | 442 | 392 | 342 | 292 | 242 | 192 | 142 | 92 |
| Position Information (Chain disengage position) | NA | 532 | 482 | 432 | 382 | 332 | 282 | 232 | 182 | 132 | 82 |

| | Position Table T4' | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position Information (Chain engage position) | 606 | 556 | 506 | 456 | 406 | 356 | 306 | 256 | 206 | 156 | NA |

-continued

| Position Table T4' | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position Information (Central position) | 596 | 546 | 496 | 446 | 396 | 346 | 296 | 246 | 196 | 146 | 96 |
| Position Information (Chain disengage position) | NA | 536 | 486 | 436 | 386 | 336 | 286 | 236 | 186 | 136 | 86 |

| Position Table T5' | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position Information (Chain engage position) | 610 | 560 | 510 | 460 | 410 | 360 | 310 | 260 | 210 | 160 | NA |
| Position Information (Central position) | 600 | 550 | 500 | 450 | 400 | 350 | 300 | 250 | 200 | 150 | 100 |
| Position Information (Chain disengage position) | NA | 540 | 490 | 440 | 390 | 340 | 290 | 240 | 190 | 140 | 90 |

| Position Table T6' | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position Information (Chain engage position) | 614 | 564 | 514 | 464 | 414 | 364 | 314 | 264 | 214 | 164 | NA |
| Position Information (Central position) | 604 | 554 | 504 | 454 | 404 | 354 | 304 | 254 | 204 | 154 | 104 |
| Position Information (Chain disengage position) | NA | 544 | 494 | 444 | 394 | 344 | 294 | 244 | 194 | 144 | 94 |

| Position Table T7' | | | | | | | | | | | |
|---|---|---|---|---|---|---|---|---|---|---|---|
| Chainring | 1 | 2 | 3 | 4 | 5 | 6 | 7 | 8 | 9 | 10 | 11 |
| Position Information (Chain engage position) | 618 | 568 | 518 | 468 | 418 | 368 | 318 | 268 | 218 | 168 | NA |
| Position Information (Central position) | 608 | 558 | 508 | 458 | 408 | 358 | 308 | 258 | 208 | 158 | 108 |
| Position Information (Chain disengage position) | NA | 548 | 498 | 448 | 398 | 348 | 298 | 248 | 198 | 148 | 98 |

In the operation of this second embodiment, enable the microcontroller unit 11' to select one position table T1'~T10', and then adjust the position of the derailleur 41' according to the selected position table T1'~T10'. This second embodiment adds the chain engage position and the chain disengage position to the position tables T1'~T10', making the gear-shifting more smoothly. The reason is that when the actual gear-shifting is performed on the actual mechanism, the derailleur 41' is not only to align the chain (not shown) with the central position of one specific chainring (for example, the sixth chainring G6'), but also to move the chain forwardly a little more distance, that is, to the chain engage position, so that the chain can be quickly and accurately disengaged from the sixth chainring G6'. Similarly, when performing a downshift operation, the derailleur 41' is not only to align the chain (not shown) with the central position of one specific chainring (for example, the sixth chainring G6'), but also to move the chain backwardly a little more distance, that is, to the chain disengage position, so that the chain can be quickly and accurately engage in the sixth chainring G6'.

It can be seen from the above that the second embodiment enables the gear-shifting operation to be implemented more smooth and stable than the aforesaid first embodiment.

Other technical features of this second embodiment and the effects this second embodiment can achieve are same as the aforesaid first embodiment, and therefore, we do not repeat them herein.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An easy-adjustment bicycle gear-shifting system, comprising:
   a microcontroller unit;
   a non-transitory computer readable medium electrically connected to said microcontroller unit;
   a driver electrically connected to said microcontroller unit;
   a derailleur connected to said driver and drivable by said driver to move relative to a plurality of chainrings of a bicycle so as to shift the chain of said bicycle;
   wherein said non-transitory computer readable medium has stored therein at least three position tables, each said position table containing the position information of said derailleur relative to said chainrings, the position information contained in one said position table having at least a part different from the position information contained in every other said position table, said position tables being arranged one after another in a proper order corresponding to one same chainring, every two adjacent said position tables being differed by a predetermined value corresponding to one same said chainring; said microcontroller unit selects one said position table, and drives said driver to shift said derailleur to the corresponding position according to the position information of the selected said position table;
   wherein each said position information of each said position table contains three positions respectively corresponding to a central position of the respective said chainring, a chain engage position corresponding the chain at one side of the respective said chainring, and a chain disengage position of corresponding the chain at the other side of the respective said chainring.

2. The easy-adjustment bicycle gear-shifting system as claimed in claim 1, wherein said position information is an angle value, distance value, or length value.

3. The easy-adjustment bicycle gear-shifting system as claimed in claim 1, wherein each said position information of each said position table aligns with a central position of one respective said chainring.

4. The easy-adjustment bicycle gear-shifting system as claimed in claim 1, wherein said chain engage position of each said position information is in an advanced position relative to the associating said central position and different from the associating said central position by a predetermined value; said central position is in an advanced position relative to the associating said chain disengage position and different from the associating said chain disengage position by a predetermined value.

5. The easy-adjustment bicycle gear-shifting system as claimed in claim 1, further comprising an input device electrically connected to said microcontroller unit; said microcontroller unit is controllable by said input device to select said position tables.

6. The easy-adjustment bicycle gear-shifting system as claimed in claim 1, wherein for one same said chainring, all the position information of one said position table are different from the position information of one adjacent said position table.

\* \* \* \* \*